(12) United States Patent
Archuletta (10) Patent No.: US 7,914,275 B1
(45) Date of Patent: Mar. 29, 2011

(54) APPARATUS FOR MAKING HIGH DENSITY WOOD AND PLASTIC COMPOSITES

(76) Inventor: Phil Archuletta, Mountainair, NM (US)

( * ) Notice: Subject to any disclaimer, the term of this patent is extended or adjusted under 35 U.S.C. 154(b) by 281 days.

(21) Appl. No.: 11/804,537

(22) Filed: May 18, 2007

Related U.S. Application Data (60) Provisional application No. 60/802,237, filed on May 19, 2006.

(51) Int. Cl.
B29C 43/44 (2006.01)
B29C 43/52 (2006.01)

(52) U.S. Cl. ............... 425/371; 425/335; 425/338

(58) Field of Classification Search ............. 425/363, 425/364 R, 335, 336, 338, 339, 371, 372, 425/325

See application file for complete search history.

(56) References Cited

U.S. PATENT DOCUMENTS

| | | | | |
|---|---|---|---|---|
| 4,083,912 A | * | 4/1978 | Platte et al. | 264/120 |
| 4,285,654 A | * | 8/1981 | Bohm et al. | 426/327 |
| 4,396,566 A | * | 8/1983 | Brinkmann et al. | 264/70 |
| 4,409,175 A | | 10/1983 | Bjorhaag | |
| 4,410,380 A | | 10/1983 | Ahrweiler et al. | |
| 4,417,866 A | * | 11/1983 | Sitzler | 425/364 R |
| 4,512,942 A | * | 4/1985 | Babbin et al. | 264/474 |
| 4,616,991 A | | 10/1986 | Bach et al. | |
| 4,636,345 A | * | 1/1987 | Jensen et al. | 264/122 |
| 4,826,560 A | * | 5/1989 | Held | 156/498 |
| 4,956,140 A | * | 9/1990 | Rolles et al. | 264/280 |
| 5,053,177 A | * | 10/1991 | Vetter et al. | 264/134 |
| 5,053,180 A | * | 10/1991 | Wang et al. | 264/290.2 |
| 5,088,910 A | | 2/1992 | Goforth et al. | |
| 5,244,618 A | * | 9/1993 | Kemerer et al. | 264/166 |
| 5,516,472 A | | 5/1996 | Laver | |
| 5,725,939 A | | 3/1998 | Nishibori | |
| 5,972,265 A | | 10/1999 | Marra et al. | |
| 6,153,293 A | | 11/2000 | Dahl et al. | |

* cited by examiner

*Primary Examiner* — Yogendra N Gupta
*Assistant Examiner* — Emmanuel S Luk
(74) *Attorney, Agent, or Firm* — Rod D. Baker (57) ABSTRACT

There is disclosed a pressing apparatus for fabricating a dense, rigid, durable panel from a molten composite material, such as a composite of wood fibers and thermoplastic. The apparatus features a first platen in spaced and angled relation to a second platen to define a gap between said platens. The gap decreases uniformly from first ends of the platens toward second ends of the platens, and conveyer belts, movably disposed along opposing surfaces of said platens, move molten composite material through the decreasing gap to compress the molten composite material between the platens, while substantially simultaneously the material undergoes first passive and then active cooling into a rigid sheet.

12 Claims, 4 Drawing Sheets

APPARATUS FOR MAKING HIGH DENSITY WOOD AND PLASTIC COMPOSITES

CROSS-REFERENCE TO RELATED APPLICATIONS

This application claims the benefit of the filing of U.S. Provisional Patent Application Ser. No. 60/802,237, filed on May 19, 2006, and the specification thereof is incorporated herein by reference.

BACKGROUND OF THE INVENTION

1. Field of the Invention (Technical Field)

The present invention relates to apparatus for manufacturing composite materials of wood and plastic, particularly sheets of relatively high density wood-plastic composition (especially compositions incorporating ground, milled, or commutated whole trees such as juniper or pine), and related manufacturing methods.

2. Background Art

It is known to manufacture composite materials from mixtures of ground or milled wood and finely ground plastics. A method and apparatus for manufacturing such a composition is disclosed in U.S. Pat. No. 6,632,387 and U.S. Pat. No. 6,586,504, the disclosures of which are incorporated herein by reference. It is generally desirable to manufacture composite material in sheets or panels suitable for use in the construction of buildings, signs, and the like.

Current manufacturing techniques for thermoplastic-fiber composite materials focus on the extrusion process, whereby a molten cellulose/thermoplastic mix is forced under high pressure through a forming die. The product is shaped and formed corresponding to the die, and then allowed to cool. In some instances, the cooling of the extruded product is accomplished by wrapping the extruded product around one or more large, chilled, cylindrical mandrels. Such a cooling technique, however, flexes the product resulting in unacceptable fracturing of sheet or panel product having a thickness of more than about 0.5 inches. Alternatively or additionally, known fabrication processes require post-extrusion cooling mechanisms that are dozens of feet long, demanding large manufacturing facilities. Known extrusion-type production devices generally also are limited as to both the width and thickness of panels or sheets than can effectively be produced.

A further shortcoming of known systems and methods for manufacturing cellulose/plastic composites is the difficulty in cooling the product while also obtaining desirable product density. Upon expulsion from and extruder, product may expand, and any extensive further processing of the product, including cooling at atmospheric pressure, may result in a product of insufficient density and strength. Many composite products produced with known devices and methods lack desirable shear and bending strengths. Further, many composite products of current modes of fabrication are believed to be undesirably friable, compromising their integrity after prolonged exposure to weather extremes.

In summary, therefore, there is an unmet need for a method of manufacturing a wood-plastic composite material in sheets that can readily be cut into construction panels of conventional size (e.g. four feet by eight feet), which material is of adequate density and durability for use as a construction material. Such a fabrication method requires a combination of optimal pressure, and cooling, rates for an extruded material. Against this background, the present system and process was developed.

SUMMARY OF THE INVENTION

Disclosure of the Invention

There is disclosed herein a pressing apparatus for fabricating a dense, rigid, durable panel from a molten composite material. Succinctly described, the apparatus features a first platen in spaced and angled relation to a second platen to define between said platens a gap. The gap decreases uniformly from first ends of the platens toward second ends of the platens, and conveyer belts, movably disposed along opposing surfaces of said platens, move molten composite material through the decreasing gap to compress the molten composite material between the platens, while substantially simultaneously the material undergoes first passive and then active cooling into a rigid sheet.

A primary object of the present invention is to provide a method and apparatus for manufacturing a cellulose/thermoplastic composite panel of substantial thickness, width, density and strength.

A primary advantage of the present invention is the simplicity and versatility of the disclosed apparatus.

Another advantage of the present invention is the relative portability of the disclosed manufacturing apparatus.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DESCRIPTION OF THE PREFERRED EMBODIMENTS

Best Modes for Carrying Out the Invention

This disclosure has to do with the fabrication of strong, dense, useful panels comprised of a plastic/fibers composition. It is contemplated that the panels are manufactured from an extruded composite material having wood and thermoplastic particles as its primary ingredients, but the invention is not so limited. There is provided according to the present disclosure an apparatus and method for manufacturing a wood-plastic component that is more durable, stronger, and denser than similar composites produced with known techniques. The present apparatus and method provide for the controlled compression of the composite while it cools, resulting in enhanced physical characteristics of the end product. The invention also promotes cooling at a suitable rate with a modest water-cooling system much less elaborate than water-cooling systems in devices currently used in the art. By providing a "moving press" apparatus and technique, the molten composite material is expelled from an extrusion die, but then cools under pressure conditions that generate a composite material panel that is dense and strong, and which also permits the fabrication of panels that are wider than are generally obtained with known devices.

This invention is not of any particular extrusion apparatus, or of a specific extrusion die or method. Rather, any or several extruders known in the art may be employed herein, and the disclosed apparatus and method relate to the processing of an extruded composite after it has been expelled from an extruder die. Thus, extruders and extrusion dies known, or yet to be known, in the art may be employed in conjunction with this method and apparatus. However, and as noted, an advantage of the present technique is that it can be used with extruder die(s) to permit production of a panel of comparatively increased thickness and width.

Among the advantages of the presently disclosed system and process is that composite material may be formed into sheets of adequate width, thickness, and density so as to be suitable for use in construction, such as, for example, building panels, signs, and the like which are subjected to weathering heat, moisture, and ultraviolet sunshine. By compressing an extruded cellulose-thermoplastic composition while cooling it in a controlled manner, sheets of suitable thickness, width, and density are manufactured.

Described generally, the method of the present disclosure is to compress a molten, malleable, composition between a pair of converging platens. The composition is pushed and pulled between the platens by a pair of endless belts. As the belts move the composition into a decreasing gap between the platens, the composition is simultaneously compressed and cooled. The concurrent compression and cooling promotes the fabrication of a sheet of hardened composite sheet of desirable density and durability.

Attention is invited to the drawing figures, which depict the various aspects of the apparatus 10 and process. The apparatus is situated immediately adjacent to the die 20 on an extruder 22. The extruder 22 is of a known powered type, and forces molten composite through its die 20 and toward the apparatus 10 for further processing. The composite is extruded from the die at around 400° F., and upon such expulsion is a viscous, plastic, malleable semi-solid. Initial preparation of the composite material, prior to heating and extrusion, may be according to instructions known in the art such as, by way of example only, those disclosed in U.S. Pat. No. 6,586,504.

Figure 1:
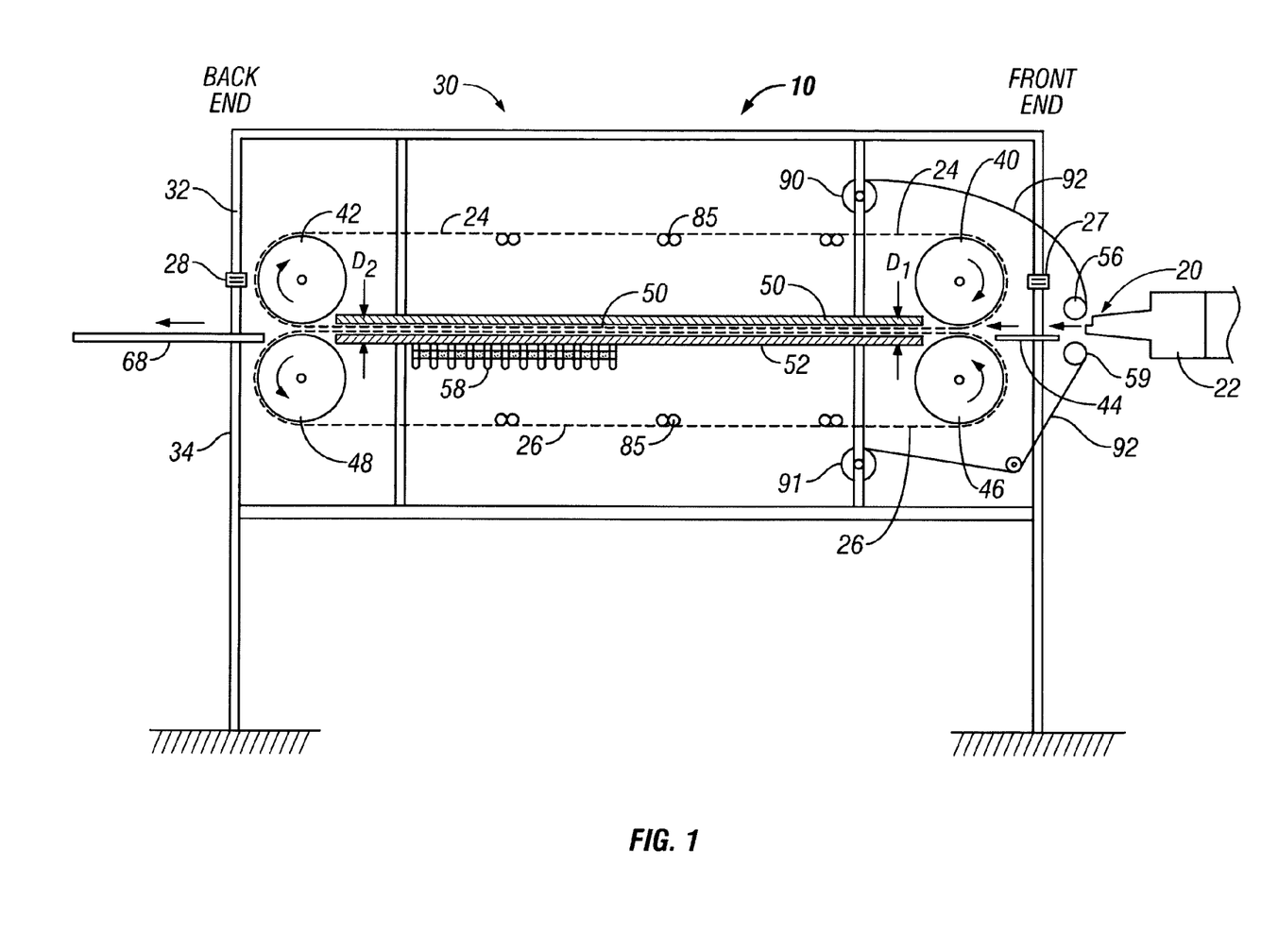
FIG. 1 is a left side elevation diagram, in partial section, of an apparatus according to the present disclosure.

The extruded material is fed through a "moving press" system mounted in a frame 30. The support frame 30 is fabricated from, for example, lengths of angle iron, steel tubing, steel rods, brackets, flanges and the like; assembly of the frame 30 is according to ordinary skill as informed by this disclosure. The frame 30 rests upon the floor of a fabrication facility and has an upper frame 32 and lower frame 34. The frame 30 is, by way of example only, about six to fourteen feet long from its front end to its back end, and approximately five feet wide. (The "front" of the apparatus 10 is to the right of the view seen in FIG. 1, while the "back" is to the left side of that figure.) Mounted for powered rotation on the upper frame 32 are a cylindrical upper front roller 40 and a cylindrical upper back roller 42. The upper rollers 40, 42 are journaled in the upper frame 32 for rotation around their preferably parallel, horizontally disposed axes. Similarly mounted for powered rotation on the lower frame 34 are the cylindrical lower front roller 46 and lower back roller 48. As seen in FIGS. 1 and 3, the upper front roller 40 preferably is situated substantially directly above the lower front roller 46, while the lower back roller 48 is substantially directly below the upper back roller 42. The rollers 40, 42, 46, 48 have diameters of, for example six to twenty inches, depending upon the proportional size of the overall apparatus 10.

Preferably, at least one upper roller 40 or 42 is adjustably mounted, so that it can be shifted axially with respect to its own axis (and thus laterally in relation to the frame 30 and extruder 22). At least one of the upper rollers 40, 42 preferably also is adjustable such that it can be shifted in relation to the other upper roller (42 or 40). This adjustability allows the distance between the upper rollers 40, 42 to be varied and temporarily fixed (while preferably keeping parallel the axes of the upper rollers), so that these rollers can be moved closer or farther apart. Preferably, both upper rollers 40, 42 are adjustably mounted, so that either or both can be relocated upon the upper frame 32.

Likewise, at least one (and preferably both) of lower rollers 46 or 48 is adjustably mounted, so that it can be shifted axially with respect to its axis (and thus laterally in relation to the frame 30 and extruder 22). At least one and preferably both of the lower rollers also is adjustable so that it can be shifted in relation to the other lower roller (48 or 46), that is, so that the distance between the lower rollers 46, 48 can be adjusted and temporarily fixed (while maintaining their axes parallel). Adjustability in the lateral (axial) direction also is desirable to assure that the belts 24, 26 (disposed around the rollers as described further herein) remain "centered" on the rollers during the operation of the apparatus 10.

Figure 2:
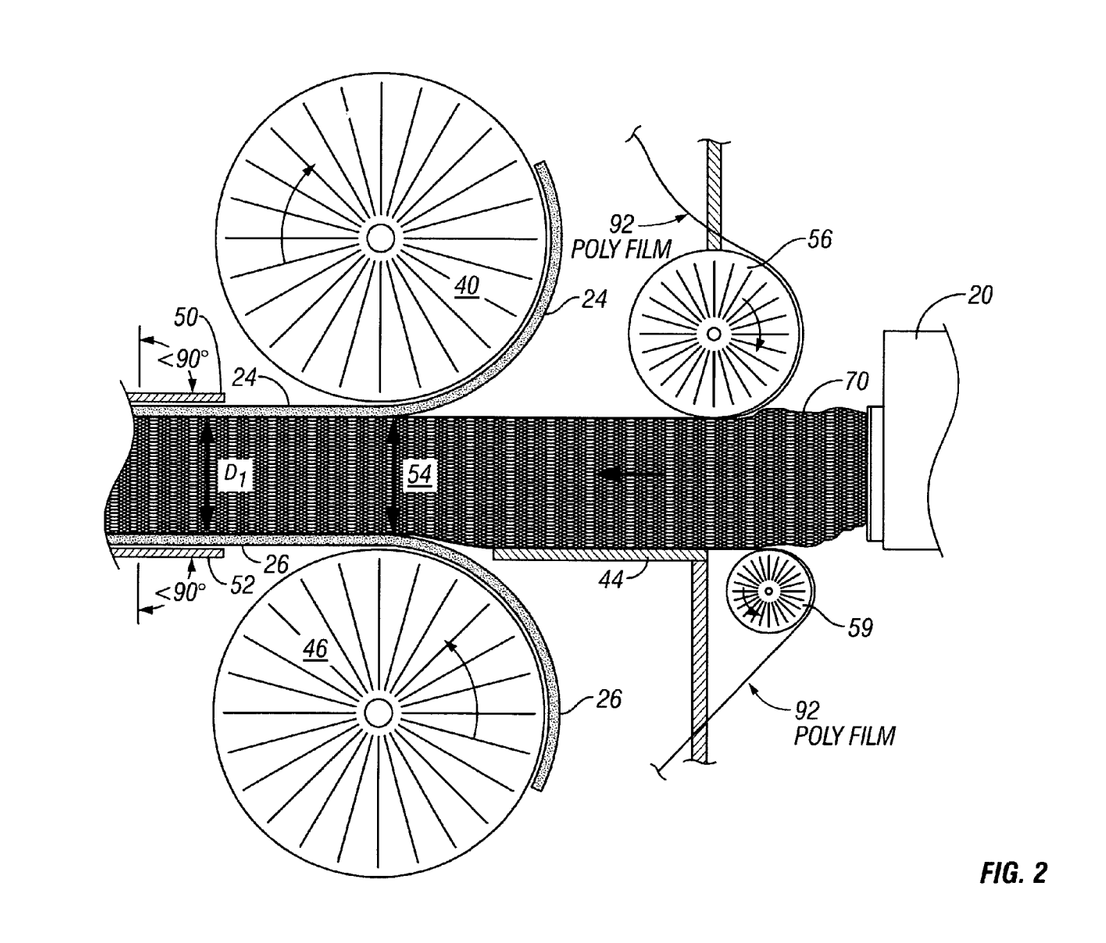
FIG. 2 is an enlarged side view of the left side of a front portion of the apparatus shown in FIG. 1.

Referring to FIGS. 1 and 2, it is seen that the front rollers 40, 46 are disposed in the frame 10 so that there outer surfaces are closely spaced. At their closest mutual approach, the distance separating their parallel (approximately horizontal) tangents is, by way of example in a preferred embodiment, about one inch, plus or minus approximately 0.5 inch. The rear rollers 42, 48 are even more closely spaced, with their closest tangents being about 0.75 inch apart, plus or minus about 0.25 inch. That the front rollers 40, 46 have a separation distance greater than the distance separating the surfaces of the rear rollers 42, 48 is one advantageous feature of the apparatus.

At least one of the upper rollers 40, 42, and at least one of the lower rollers 46, 48, is driven to have powered rotation around its axis. All the rollers may be directly or indirectly connected to a power source. Rotary power may be supplied to any roller (again, at least one upper and at least one lower roller) in any suitable manner, as by having a chain-and-sprocket connection to an electric motor. Practically any means and modes known in the art for powered rotation of cylindrical rollers may be deployed without departing from the scope of the present invention.

Figure 3:
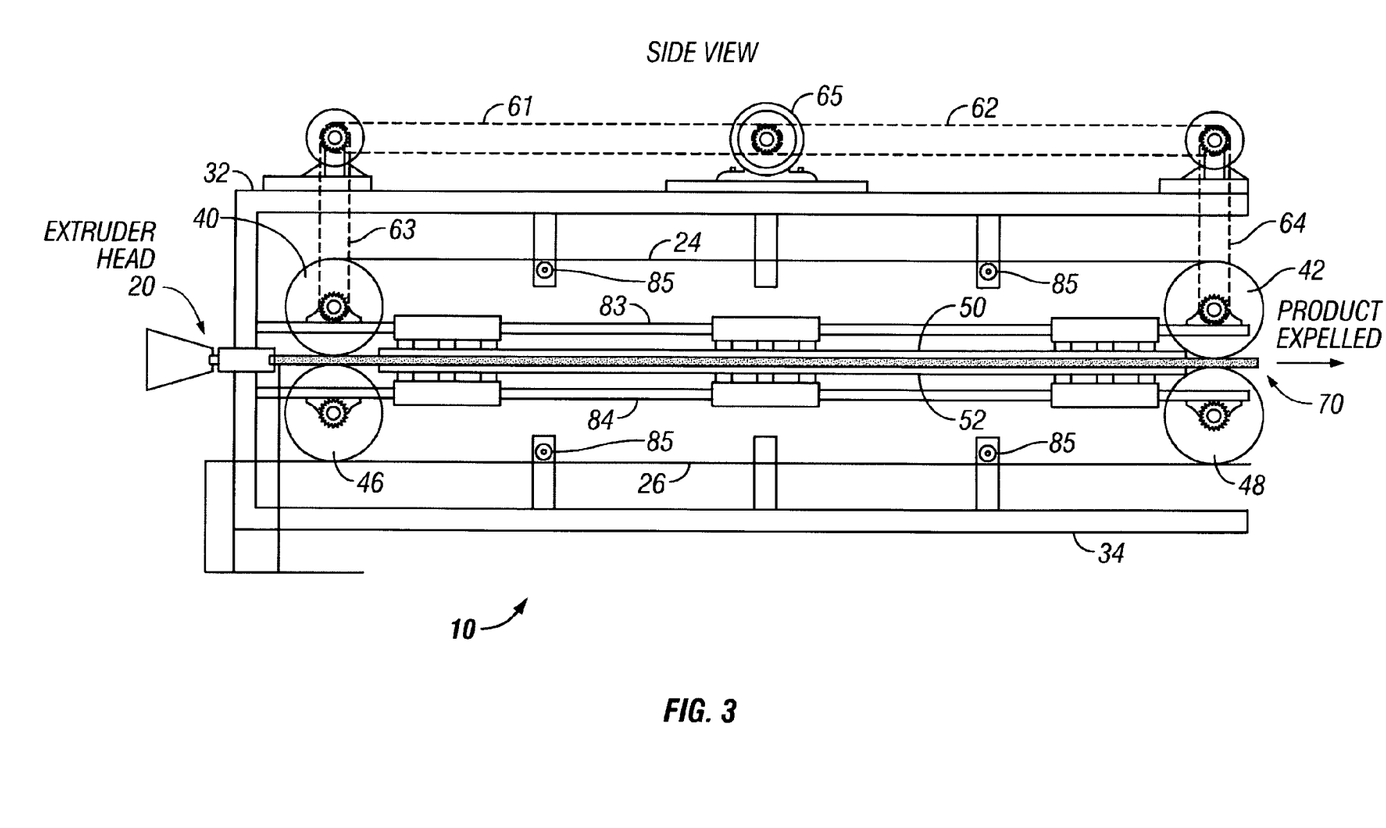
FIG. 3 is a right side elevation diagram of an apparatus according to the present invention.

The upper frame 32 mounts a flat, rectangular, substantially planar upper platen 50 that is, for example, about five to nine feet long, and between sixteen and forty-eight inches wide. These dimensions are supplied by way of example; all platen dimensions are in proportion to the apparatus 10, whose size is keyed to the size of the composite sheets desired to be manufactured. Connected to the lower frame 34 is a similarly sized and shaped lower platen 52. As seen in FIGS. 1 and 3, the upper platens 50 and lower platen 52 extend longitudinally between the upper rollers 40, 42 and lower rollers 46, 48, respectively. The lower platen 52 is positioned and held in the lower frame 32 such that the upper surface of the lower platen 52 is approximately tangential to the uppermost arcs of the lower rollers 46, 48. In a similar manner, the lower surface of the upper platen 50 is approximately tangential to the lowermost arcs of the upper rollers 40, 42. While the platens 50, 52 are situated very generally horizontally, in the preferred embodiment they are not both truly horizontal, nor are they parallel. The platens 50, 52 are mounted in the frame 30 so to be non-parallel, and at least one of them defines a very mild angle with respect to horizontal, as shall be further described herein after.

Each pair of rollers 40, 42 and 46, 48 has disposed there around a continuous belt. An upper belt 24 is wrapped around the upper rollers 40, 42, and the lower belt 26 is wrapped around the lower rollers 46, 48. The upper rollers 40, 42 are adjusted so that the upper belt 24 is tautly engaged with the upper rollers, and the frictional engagement of the belt 24 with at least one, preferably both, of upper rollers 40, 42 results in the belt 24 moving as the upper rollers rotate. The upper belt 24 accordingly acts as a track conveyor belt that moves under the power of one or both rollers 40, 42. The belt 24 thus continuously moves circuitously around the rollers 40, 42 as the rollers undergo powered rotation about their respective axes. And similarly again, the lower rollers 46, 48 are adjusted so that the lower belt 26 is tautly engaged around the lower rollers, and the frictional engagement of the belt 26 with one or both lower roller 46, 48 results in the lower belt 26 moving as the lower rollers rotate. The lower belt 26 accordingly acts as a track conveyor belt that moves under the power of one or both lower rollers 46, 48, and moves circuitously around the pair of lower rollers so long as they rotate.

In one working prototype of the invention, the belts 24, 26 provided were 12"×204" continuous, heavily reinforced rubber belts available as Item No. SFE 3042384X3264R from Kaman Corporation of Bloomfield, Conn., USA. Such belts must be capable of withstanding the elevated temperature of molten composite product as it emerges from the extrusion die 20.

Referring still to FIGS. 1 and 2, the upper platen 50 is situated "inside" the upper belt 24, and the lower platen 52 is inside the lower belt 26. Thus, the upper belt 24 moves around the two upper rollers 40, 42, and also moves around the upper platen 50. The tension in the upper belt 24 holds it in flush sliding contact with the lower surface of the upper platen 50. The upper belt 24 accordingly is in sliding contact with longitudinal length of the upper platen 50, as the belt extends between the lower-most arcs of the upper rollers 40, 42. In a similar but inverse manner, the lower belt 26 moves around the two lower rollers 46, 48, and moves around the lower platen 52. The tension in the lower belt 26 holds it in flush sliding contact against the upper surface of the lower platen 52. Thus, the lower belt 26 is in sliding contact with the longitudinal length of the lower platen 52, as the belt 26 extends between the uppermost arcs of the lower rollers 46, 48. In this disclosure and in the claims, "sliding contact" includes the use of bearings, small rollers, or wheels to promote smooth movement of the belt along and against the surface of a platen.

The platens 50, 52 in the preferred embodiment are not parallel. The platens, in operative combination with the belts 24, 26, function to provide the "moving press" advantage of the apparatus. Rather than being parallel, the platens 50, 52 are arranged to converge towards the back or discharge end of the apparatus. Referring to FIG. 1, it is seen that at the front end (to the right in FIG. 1) of the platens, the belts 24, 26—which are in sliding contact with the platens 50, 52—are separated by a distance $D_1$. At the opposite, back end of the platens, the belts 24, 26 (again in flush contact with the platens) are separated by a second distance $D_2$. In this apparatus, $D_1$ is always greater than $D_2$. This is accomplished by tilting one or both platens 52, 52 slightly from the horizontal. As illustrated in FIG. 2, the upper platen 50, for example, is canted so that the angle defined between the top of its front end portion and the vertical is slightly less than 90 degrees. Thus the front end of the upper platen 50 is in this example slightly higher than the opposite back end, in relation to the floor or other horizontal datum. As likewise seen in FIG. 2, the angle defined between the bottom of the front end portion of the lower platen 52 and the vertical is slightly less than 90 degrees. Thus the front end of the lower platen is slightly lower than its back end.

It is noted, however, that the central concept is the convergence of the platens 50, 52 proceeding from the front of the apparatus 10 toward its back (i.e., right to left in FIG. 1). This convergence may be realized by disposing one of the platens generally horizontal while tilting the other, opposing, platen away from the horizontal. It is relative convergence that is contemplated, and a suitable configuration of the apparatus 10 could be devised wherein the platens approach a vertical orientation in relation to the floor or ground.

In one embodiment of the apparatus, the platens 50, 52 are about seven feet long. The belts 24, 26 thereon are spaced apart a distance of $D_1$ at their front ends (FIG. 1), the distance $D_1$ being about 0.375 inches, plus or minus about 0.031 inches. In this example, the thickness of the belts is taken into account, the distance of separation actually being taken from the face of the upper belt 24 to the face of the lower belt 26; thus, the platens actually are spaced to account for the thickness of the belts, each belt 24 or 26 may be about 0.187 inches thick. At the other, back end of the platens, the belts are separated by a distance $D_2$ that is about 0.25 inches, plus or minus 0.031 inches. Thus, it is seen that the belts and platens converge, progressing from the front end of the apparatus toward the back end.

The degree of tilt of one or both platens 50 and/or 52 preferably is adjustable, so to also selectively control the convergence of the platens. One such manner of controlling and adjusting is to have the lower platen fixed in position within the lower frame 34, but slightly adjust the position of the upper frame 32 in relation thereto. One possible manner of adjusting the angle between the two platens 50, 52 is by means of shimmed junctions 27, 28 connecting the upper frame 32 to the lower frame 34 at the front (27) and the back (28) of the apparatus 10. Only two such shimmed junctions are depicted in FIG. 1, it being understood that there are similar junctions at each of the four horizontal corners of the overall frame 30. Because in one embodiment the upper platen 50 is fixedly secured to the upper frame 32, and the lower platen 52 is fixedly secured to the lower frame 34, calculated manipulation of one or both shimmed junctions 27 or 28 (i.e., by adding or removing shims of selected thicknesses) results in the selective raising or lowering of the front end of the upper frame 32 in relation to the front end of the lower frame 34. Raising the front end of the upper frame 32 increases the angle of convergence between the platens, while lowering it closer to the front end of the lower frame 34 decreases the angle of convergence.

It will be immediately understood, however, that any of a wide variety of modes for adjusting the angular position of the upper platen 50 relative to the lower platen 52 may be employed. For example, hydraulic and/or screwable junctions and connectors may be employed, and either manual or motorized means may be adapted. Threaded connections permitting powered "screwed" adjustment of the relative positions of the platens is within ordinary engineering capabilities. Further, it is within the capability of a mechanic of ordinary skill to devise a variety of different yet suitable means for adjusting the respective angles of tilt of the two platens 50, 52 to permit the angle of convergence between the platens to be finely tuned. Such adjustments may be, for example, by having a unitary frame 30 and relatively immobile upper and lower frame sections, but pivotally connecting an end (such as the back end) of each platen 50, and or 52 to the frame 30 (e.g., in a hinge-like manner), and then having a controlled powered means (hydraulic, rotating screw-with-threaded receiver) for moving the opposite end(s) of the platens up or down. The "inclined planes" comprising the two platens 50, 52 thus are adjustable to define a wide range of angles relative to the horizontal. Accordingly, the thickness of a sheet of composite material 70, as it moves through the apparatus according to the present process, can be regulated to generate a final product of a pre-selected thickness.

As depicted by the directional arrows in FIGS. 1 and 2, the front rollers 40, 46 are driven to rotate in opposite directions. The lower front roller 46 rotates counterclockwise as seen in FIGS. 1 and 2 (clockwise in FIG. 3), while the upper front roller 40 rotates clockwise (counterclockwise in FIG. 3). The upper back roller 42 rotates in the same "sense" or direction as the upper front roller 40, and the lower back roller 48 rotates the same direction as the lower front roller 46. At the front of the apparatus 10, therefore, the belts 24 and 26 converge as they round the bends defined by the front rollers 40, 46; at the back of the apparatus, the belts diverge as they round the bends defined by the back rollers 42, 48.

FIGS. 1 and 2 show how, when molten composite material 70 emerges from the extrusion die 20, it is pushed toward the moving rollers 40, 46 by the action of the extruder 22. The material 70 is pushed across the heated bridge 40 toward the front rollers 40, 46; upon entering the gap 54 between the front rollers, the material is caught by the moving belts 24, 26, and forcibly fed between the front rollers and toward the platens 50, 52. The traction of the belts 24, 26 moves the malleable material through the processing provided by the apparatus 10.

FIGS. 1 and 2 also show the bridge 44 and the pre-compression roller 56. The bridge 44 is, preferably, a heated metal structure that supports the moving material as it approaches the moving rollers 40, 46 and belts 24, 26. The bridge very preferably is heated (e.g. to about 200-300° F.) by any suitable means, either internally (e.g., internal electrical resistance coils) or externally (overhead heating coils or lamps) to maintain the viscosity of the material 70. It has been determined that the bridge 44 preferably is composed of stainless steel, to which the molten material 70 is not prone to adhere.

Particular reference is made to FIG. 2, an enlarged view of the apparatus in the vicinity of the extruder die 20. The cylindrical pre-compression roller 56 is a free-wheeling roller of comparatively reduced diameter. The pre-compression roller 56 preferably has its working surface comprised of stainless steel, also to avoid adhesion of the molten composite material 70 thereto. The pre-compression roller 56 serves to even the upper surface of the moving material 70 as the material emerges from the extrusion die 20, and also to mildly "smash" or compress the material 70 prior to the material's delivery into the gap 54 between the belts 24, 26. This pre-compression function is believed to enhance the ultimate strength of a finished composite product panel.

The vertical distance between the bottom tangent of the pre-compression roller 56 and the bridge 44 is selectively adjustable by controlled movement of the bridge and/or the roller 56. Preferably, the absolute vertical position of the bottom of the pre-compression roller 56 is just slightly lower than the height of the top of the orifice of the extrusion die 20. When adjusted to a desired separation distance, the bridge 44 and pre-compression roller 56 are temporarily locked into position. (Their relative positions preferably are adjustable, but fixed during operation of the apparatus.)

A continuous "ribbon" or sheet of molten composite material is delivered to the apparatus 10 so long as the extruder 22 remains active.

As the composite material 70 emerges from the die 20 as seen in FIG. 2, it is forced toward the pre-compression roller 56. The roller 56 engages the upper portions of the mass of material 70, and mildly presses the material to a vertical thickness equal to or modestly greater than the minimum distance separating the front rollers 40, 46 (with the belts thereon). Some rotary force is applied to the pre-compression roller 56 by the longitudinal progress of the moving material 70. It is seen therefore, that the heated bridge 44 serves to support the material 70 as it translates from die 20 to rollers 40, 46. The bridge 44 and pre-compression roller 56 in combination serve to pre-form and pre-compress the moving molten material 70 into a material shape and thickness that promotes smooth passage of the material into the gap 54 between the front rollers 40, 46.

Thus, the enlarged view of the apparatus seen in FIG. 2 depicts in side view how the molten composite material 70 emerges from the die 20 to flow between the pre-compression roller 56 and heated bridge 44 and into the gap 54. The moving belts 24, 26 then forcibly pull the sheet of material 70 in between the platens 50, 52 at an initial thickness of $D_2$.

Attention is returned to FIG. 1. Adjacent to the "downstream" half-length of the lower platen 52 is provided a heat transfer core 58. The heat transfer core 58 is a water-cooled radiator element of generally conventional construction. Cooler core 58 is placed in immediate adjacency or contact with the underside of the lower platen 52, and serves to remove heat from the lower platen by conduction and/or convection. (In alternative embodiments, a cooler core may also, or alternatively, be provided in a similar corresponding location adjacent the upper platen 50.) The cooler core 58 serves to cool the "back" portion of the platen 52, and thus to promote cooling of the material 70 before it emerges from the downstream or back end of the apparatus 10.

Notably, the cooler core 58 is located near the back half of the platen 52 only. It has been determined that the cooler core preferably not be placed on the "front" half of the platen 52, as doing so promotes too rapid of cooling of the material 70 moving through the apparatus 10. Rather, the cooling core 58 has a longitudinal extent that is one-half or less (e.g., approximately 33%) of the longitudinal extent of the platen 52 itself, and is located at the downstream half of the platen 52. Active cooling of the composite material 70 accordingly occurs in the moments immediately prior to the material's emergence from the apparatus 10.

In practice, the method and apparatus of the invention function as a "moving press" for the composite material. Once the viscous material 70 is delivered across the bridge 44 to the rotating front rollers 40, 46 and rolling belts 24, 26, the material is drawn into the gap 54 and is compressed between the front rollers. Such compression is maintained and continued by the action of the belts 24 and 26 which press down and up, respectively, against the material sandwiched there-between. At the point of entry between the front rollers, the material 70 may have a thickness of, for example, 0.375 inches to 0.5 inches, and can be anywhere from a foot to about four feet in lateral breadth.

The moving belts 24, 26 draw and convey the, hot, still-malleable sheet of composite material 70 into the horizontally broad, but vertically narrow, space between the platens 50, 52. The conveyor belts 24, 26 transport the material 70 from the front end of the apparatus 10 to the back end thereof. The constantly moving belts 24, 26 forcibly convey the material 70 into the vertically ever-narrower space between the platens 50, 52. Owing to the convergent disposition of the platens relative to one another, as the material 70 is transported between the moving belts 24, 26 and toward the back end of the apparatus 10, the material is constantly and increasingly compressed; this compression occurs between the belts due to the immobility of convergent platens 50, 52. Use of an appropriately sized die 20 permits the ribbon of composition 70 to be rolled and compressed into a sheet of desirable lateral breadth, e.g., four feet. The compression occurs during the entire time the ribbon sheet of material 70 is moving the length of the apparatus 10. Significantly, the sheet of material cools while it is under compression, which promotes the density, strength, and integrity of the finished composite product.

Passive cooling of the composite material 70 thus takes place in the front half of the apparatus 10, where the platens 50, 52 are (comparatively) further apart, and where the material is still relatively plastic. As the moving belts 24, 26 transport the sheet of material into the back half of the apparatus, active cooling of the material optionally occurs under the influence of the heat transfer core 58.

Although the composite material is hardening as it cools, it nevertheless is further and increasingly compressed as the vertical distance between the two platens progressively decreases as the material approached the back end of the apparatus. The converging platens and belts sandwich the material into an ever-narrower vertical space, thus constantly compressing the material 70 until it has hardened to the desired thickness and density. The desired thickness of the sheet of product thus may be, as seen in FIG. 1, a distance equal to or perhaps slightly less than $D_2$, the distance between the belts 24, 26 at the back ends of the platens 50, 52.

Accordingly, during its transport through the length of the apparatus 10, the sheet of composite material may be compressed, by the wedging effect of the converging platens 50, 52, from an initial thickness of, for example, about 0.375 inches to a final thickness of about 0.25 inches. These thicknesses are offered by way of example, not limitation; the adjustability of either or both platens 50, 52 permit variability in both initial and final thicknesses of the material sheet.

Once the sheet of composite material has proceeded through the apparatus 10 by the translating movement of the belts 24, 26, it emerges from between the back rollers 42, 46 at the back end of the apparatus. The composite sheet product, at this point a warm but rigid panel of solid composite material, is presented to a post-processing conveyer means 68 (e.g., belt or rollers). The rigid ribbon of product is then ready for further processing (such as cross-cutting into successive panels four or eight feet in length) and finishing, as desired.

Combined reference to FIGS. 1 and 2 also shows how, optionally, the final product optionally may be provided with a smooth, shiny finish surface by melding a thin sheet of polyethylene onto one or both sides of the composite material sheet. Each of two film spools 90, 91 have a thin film of polyethylene or other suitable thermoplastic wound thereon. The film spools 90, 91 are rotatably mounted on frame 30. Polyethylene film 92 is paid out from either (or each, depending which side(s) of the product sheet 70 is to be film treated) of the spools 90, 91 for delivery to the pre-compression roller 56 and an auxiliary roller 59. The film 92 is passed around the rollers 56, 59 as best seen in FIG. 2, and is rolled onto the upper and lower surfaces of the composite material sheet 70. The action of the rollers 56, 59 presses the film 92 into the still-hot composite material 70, and the film is softened and melded to the surfaces of the material. The pressing action of the belts and main rollers on the material as it passes between the platens 50, 52 further compresses the films 92 into the respective surfaces of the composite sheet. Preferably, the films 92 are comprised of a thermoplastic similar to, or at least very compatible with, the thermoplastic constituent of the extruded composite material. As a result, the film 92 is thermally bonded and integrated to the surfaces of the product panel, providing an aesthetically pleasing finish.

FIG. 3 depicts additional possible aspects and particulars of one embodiment of the apparatus. It is seen that the rollers 40, 46, and 42, 48 may be driven by an engineered drive train of chains 61, 62, 63, 64. The chains loops 61-64 are directed and maintained by a series of suitably arranged sprockets, as well-known in the mechanical arts. The chain loops impart rotary power to two or more of the rollers 40, 46, 42, 48; the power to the system is provided by a motor 65 mounted on the frame 30. In a functional prototype of the apparatus, the motor 65 was a ½-hp electric motor, controlled with a DAYTON® brand power inverter, Model No. 3HX71, used to dramatically slow the motor rpm. Additionally, of course, the rotary action of the motor 65 can be geared down with known gearing/transmission devices.

Also seen in FIG. 3 is that there may be any number of free-wheeling intermediate minor supporting rollers 85 which guide and support the belts 24, 26 in their respective circuits around the main rollers 40, 46, 42, 48. There also may be provided suitable supporting brackets 83, 84 which support and maintain the upper and lower platens 50, 52 in their proper positions within the frame 30.

In a prototype of the apparatus, the motor 65, looped chain drive trains 61-64, and the configurations of the rollers 40, 46, 42, 48 were assembled and arranged so that the belts 24, 26 were driven at a linear speed of approximately 2,700 inches hour.

Thus the preferred embodiment of the apparatus is for manufacturing a sheet of composite material, and succinctly described has a pair of spaced-apart platens 50, 52 converging toward each other from their respective first or "upstream" ends toward their respective second or "downstream" ends, the platens thus defining between them a narrowing gap or space. A conveyer belt means 24, 26, movably disposed along the platens 50, 52, moves the molten composite material 70 in narrowing space between the platens, and from the platen first ends toward the platen second ends where it is expelled. As it moves through the space between the converging platens 50, 52, the molten composite material is compressed between said platens, while a heat transfer core 58 disposed adjacent to at least one of the platens 52 to cool the molten material 70 while it moves between the platens.

Each of the platens 50, 52 has a downstream half-length, situated remotely from the first platen ends proximate to the extruder 22. The heat transfer core 58 is disposed adjacent to a portion of the downstream half-length of a platen 50, 52, to actively cool the composite material 70 after it has undergone substantial passive cooling, and compression, between the "upstream" half-lengths of the platens. The upstream first platen ends are disposable proximately to the material extrusion die 20 so that molten composite material 70 may emerge from the die 20 for movement toward the upstream platen ends. Between the die 20 and the platens 50, 52 is a heated bridge member 44 proximate to the platen ends; the bridge 44 supports the moving material 70 as it approaches the upstream ends of the platens.

The pre-compression roller 56 optionally but preferably is disposed above the bridge member 44 to compress the moving molten composite material 70 after the material emerges from the extrusion die 20, while it approaches the platen ends. The position of at least one of the platens 50 or 52 is adjustable in relation to a second, other, platen 52 or 50 to variably regulate the narrowing space between the platens.

The conveyer belt system has the first pair of rollers 40, 42 associated with the first one 50 of the platens, the a second pair of rollers 46, 48 associated with the second one 52 of the platens, the first endless belt 24 in wrapped engagement with the first pair of rollers 40, 42 and in flush sliding contact with the first platen 50, and, finally, the second endless belt 26 in wrapped engagement with the second pair 46, 48 of rollers and in flush sliding contact with the second platen 52.

The spool means 90, 91 is from which the thin thermoplastic film 92 is deliverable to either of two auxiliary rollers 56, 59, the pre-compression roller 56 also optionally serving as a film auxiliary roller. The pre-compression roller 56 and the other auxiliary roller 59 are situated between the extruder 22 and the "upstream" platen ends. As seen in FIGS. 1 and 2, the thermoplastic film 92 is pressable by either or both auxiliary rollers 56, 59 onto a surface of the molten composite material 70.

Figure 4:
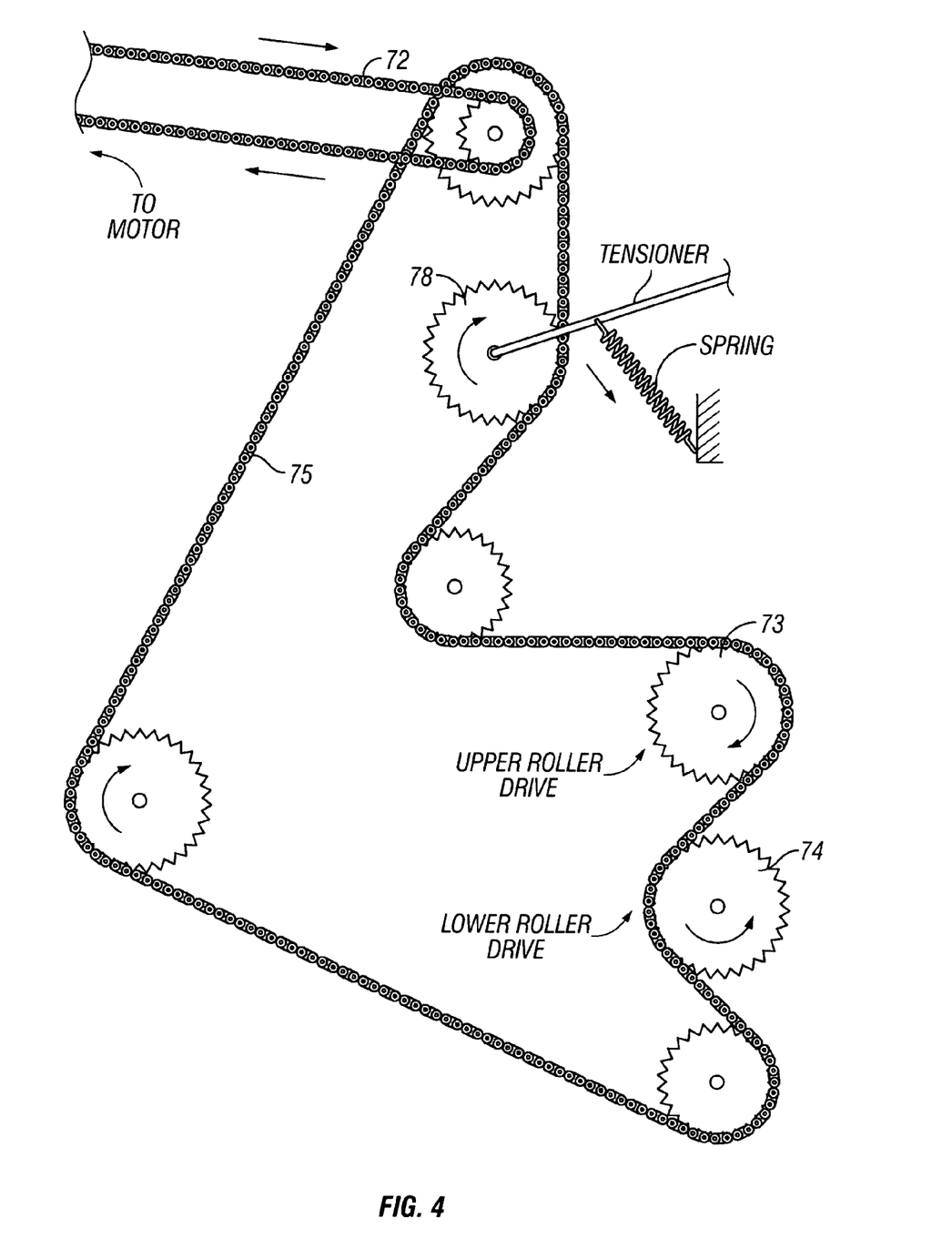
FIG. 4 is a schematic diagram of a possible chain drive train useable in the apparatus of the present disclosure.

FIG. 4 illustrates just one of many possible chain or belt drive configurations that may be utilized to drive the rollers 40, 46, 42, 48. A drive chain 72 delivers power from the motor 65 to a first sprocket. The roller chain 75 is arranged in a convoluted and serpentine fashion as shown, including the wrapping of the chain 75 past and around a pivotal tensioner sprocket 78. An the manner of wrapping and engaging the chain 75 with the upper roller drive sprocket 73 and the lower roller drive sprocket 74 to drive them in opposite directions. It should be immediately understood, however, that the possible modes of driving the rollers are nearly limitless, and include the use of drive belts, gears, drive shafts, or other powered drive trains within the comprehension of those skilled in the art.

Cooled while under constant pressure by the "moving press" feature of the apparatus 10, the rigid, durable panels of product emerge there from having high density, and a thickness of up to 0.75 inches, and yet desirably are cool enough to be handled (if needed) by a gloved worker.

In summary, there is disclosed a pressing apparatus 10 for fabricating a dense, rigid, durable panel from a molten composite material. The apparatus basically features the first planar platen 50 in spaced and angled relation to the second, lower, planar platen 52 to define between the platens a gap, the gap decreasing uniformly the first ends of the platens toward the second ends of the platens. The platens are in operative combination with the conveyer belts 24, 26, which are movably disposed along opposing surfaces of the platens, for the moving molten composite material 70 into and through the decreasing gap to compress the molten composite material between the platens.

The invention thus overcomes the drawbacks of known methods in which the product is cooled at ambient air pressures, resulting in weaker, lighter, friable composition product. Also, the use of lengthy cooling systems downstream from compression facilities is avoided. No cooling mandrels are required.

Notably, the apparatus of the invention is comparatively modest in size, and thus is semi-portable. Even including the heated extruder, a useful embodiment of the apparatus may have an overall longitudinal extent of less than about 25 feet. The apparatus 10 can, with relative ease, be dissembled, transported to a particular job site or overseas facility, or even a geographically remote location (e.g., underdeveloped nations, or rural areas), and then re-assembled for productive use.

Although the invention has been described in detail with particular reference to these preferred embodiments, other embodiments can achieve the same results. Variations and modifications of the present invention will be obvious to those skilled in the art and it is intended to cover all such modifications and equivalents. The entire disclosures of all references, applications, patents, and publications cited above are hereby incorporated by reference.

What is claimed is:

1. An apparatus for manufacturing a sheet of composite material from a molten composite material, the apparatus comprising:
    a pair of unheated spaced-apart planar platens converging toward each other throughout the complete lengths of said platens from first ends of said platens to second ends of said platens, thereby defining a narrowing space there-between, wherein each of said platens comprises:
        an upstream half-length situated proximate to said first platen ends; and
        a downstream half-length situated remote from said first platen ends;
    wherein said first platen ends are disposed proximate to a material extrusion die whereby molten material emerges from the die for movement to said first platen ends;
    conveyer belt means, movably disposed along said platens, for moving the molten composite material in said narrowing space from said platen first ends toward said platen second ends, thereby constantly compressing said molten composite material between said converging platens; and
    a cooler core disposed adjacent to only the downstream half-length of each of said platens actively to cool the molten material while the molten material is constantly compressed between said downstream half-lengths of said pair of converging platens; wherein said molten composite material undergoes only passive cooling while moving in said narrowing space between said upstream half-lengths of said pair of platens, and only active cooling while moving in said narrowing space between said downstream half-lengths of said pair of platens.

2. An apparatus according to claim 1, further comprising a heated bridge member proximate to said first platen ends for supporting the moving material as it approaches said first platen ends.

3. An apparatus according to claim 2, further comprising a pre-compression roller disposed above said bridge member to compress the moving molten composite material after the material emerges from the extrusion die and as it approaches said first platen ends.

4. An apparatus according to claim 1 wherein the position of at least one of said platens is adjustable in relation to a second platen to vary said narrowing space.

5. An apparatus according to claim 1 wherein said conveyer belt means comprises:
    a first pair of rollers associated with a first one of said platens;
    a second pair of rollers associated with a second one of said platens;
    a first endless belt in wrapped engagement with said first pair of rollers and in flush sliding contact with said first platen; and
    a second endless belt in wrapped engagement with said second pair of rollers and in flush sliding contact with said second platen.

6. An apparatus according to claim 1 further comprising:
spool means from which a thin thermoplastic film is deliverable to an auxiliary roller, said roller situated between the extruder and said first platen ends, the thermoplastic film pressable by said auxiliary roller onto a surface of the molten composite material.

7. An apparatus for manufacturing a sheet of composite material from a molten composite material, the apparatus comprising:
- a pair of unheated spaced-apart platens converging toward each other along their complete lengths from first ends of said platens toward second ends of said platens, thereby defining a narrowing space there-between, wherein each of said platens comprises:
   an upstream half-length situated proximate to said first platen ends; and
   a downstream half-length situated remote from said first platen ends; wherein said first platen ends are disposed proximate to a material extrusion die whereby the molten material emerges from the die for movement to said first platen ends;
- a first pair of rollers associated with a first one of said platens;
- a second pair of rollers associated with a second one of said platens;
- a first endless belt in wrapped engagement with said first pair of rollers and in flush sliding contact with said first platen; and
- a second endless belt in wrapped engagement with said second pair of rollers and in flush sliding contact with said second platen; wherein a molten composite material is movable by said belts in said narrowing space and from said platen first ends toward said platen second ends, thereby constantly compressing said molten composite material between said converging platens; and
- a cooler core disposed adjacent to only the downstream half-length of each of said platens actively to cool the molten material while the molten material is constantly compressed between said downstream half-lengths of said pair of converging platens; wherein said molten composite material undergoes only passive cooling while moving in said narrowing space between said upstream half-lengths of said pair of converging platens, and only active cooling while moving in said narrowing space between said downstream half-lengths of said pair of platens.

8. An apparatus according to claim 7, further comprising a heated bridge member proximate to said first platen ends for supporting the moving material as it approaches said first platen ends.

9. An apparatus according to claim 8, further comprising a pre-compression roller disposed above said bridge member to compress the moving molten composite material after the material emerges from the extrusion die and as it approaches said first platen ends.

10. An apparatus according to claim 7 wherein the position of at least one of said platens is adjustable in relation to a second platen to vary said narrowing space.

11. An apparatus according to claim 7 further comprising:
spool means from which a thin thermoplastic film is deliverable to an auxiliary roller, said roller situated between the extruder and said first platen ends, the thermoplastic film pressable by said auxiliary roller onto a surface of the molten composite material.

12. A pressing apparatus for fabricating a dense, rigid, durable panel from a molten composite material, comprising:
- a first unheated planar platen in spaced and angled relation to a second unheated planar platen to define between said platens a gap, said gap decreasing uniformly from first ends of said platens to the second ends of said platens, wherein each of said platens comprises:
   an upstream half-length situated proximate to said first platen ends; and
   a downstream half-length situated remote from said first platen ends;
- wherein said first platen ends are proximate to a material extrusion die whereby the molten material emerges from the die for movement toward said first platen ends;
- conveyer belts, movably disposed along opposing surfaces of said platens, for moving molten composite material through said decreasing gap thereby constantly to compress the molten composite material between said platens, wherein said molten composite material undergoes only passive cooling while moving in said decreasing gap between said upstream half-lengths of said pair of converging platens; and
- a cooler core disposed adjacent to only the downstream half-length of each of said platens actively to cool the molten material while the molten material is constantly compressed between said downstream half-lengths of said pair of converging platens.

* * * * *